United States Patent
Hayashi et al.

(10) Patent No.: US 7,502,286 B2
(45) Date of Patent: Mar. 10, 2009

(54) ROTATION CORRECTING APPARATUS AND OPTICAL DISK APPARATUS

(75) Inventors: Yasuhiro Hayashi, Kanagawa (JP); Hiroshi Nakane, Saitama (JP); Kazumi Sugiyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 802 days.

(21) Appl. No.: 10/996,455

(22) Filed: Nov. 26, 2004

(65) Prior Publication Data

US 2005/0128898 A1    Jun. 16, 2005

(30) Foreign Application Priority Data

Nov. 28, 2003    (JP)    ............... 2003-399773

(51) Int. Cl.
G11B 7/00    (2006.01)
(52) U.S. Cl. ............... 369/44.32; 369/44.34; 369/44.28
(58) Field of Classification Search ............... 369/44.32
See application file for complete search history.

(56) References Cited

U.S. PATENT DOCUMENTS

| 4,698,796 | A | * | 10/1987 | Kimura | .................. 369/44.28 |
| 5,491,676 | A | * | 2/1996 | Yamaguchi et al. | ...... 369/44.28 |
| 5,883,866 | A | * | 3/1999 | Shimizume et al. | ...... 369/47.41 |
| 5,909,413 | A | | 6/1999 | Araki | |
| 6,141,483 | A | * | 10/2000 | Yamada et al. | ................ 386/46 |
| 6,628,582 | B2 | | 9/2003 | Furukawa | |
| 6,999,387 | B2 | * | 2/2006 | Kuwayama | ............... 369/44.23 |
| 2003/0210621 | A1 | | 11/2003 | Hayashi | |
| 2003/0214709 | A1 | * | 11/2003 | Ono | ........................... 359/443 |
| 2003/0231565 | A1 | * | 12/2003 | Kuwayama | ............... 369/44.29 |
| 2004/0066718 | A1 | * | 4/2004 | Suh | .......................... 369/44.35 |
| 2005/0128898 | A1 | | 6/2005 | Hayashi et al. | |

FOREIGN PATENT DOCUMENTS

| JP | 64-8566 | 1/1989 |
| JP | 10-302278 | 11/1998 |
| JP | 2003-263760 | 9/2003 |

OTHER PUBLICATIONS

U.S. Appl. No. 11/092,903, filed Mar. 30, 2005, Hayashi.

* cited by examiner

Primary Examiner—Wayne R Young
Assistant Examiner—Van N Chow
(74) Attorney, Agent, or Firm—Oblon, Spivak, McClelland, Maier & Neustadt, P.C.

(57) ABSTRACT

A rotation correcting apparatus has a tracking servo controller which generates a tracking signal to perform a tracking servo control for guiding an optical beam spot outputted from a pickup to tracks of an optical disk and a track jump control for moving the optical beam spot to a certain track; a feed motor controller which controls a feed motor for moving the pickup to radius direction of the optical disk; a storage which stores signal component with a prescribed frequency band including a rotation frequency of the optical disk, the signal component being included in an output signal of the tracking servo controller; and a combination unit which combines the signal component stored in the storage with the tracking signal to generate an ultimate tracking signal for the tracking servo control and the tracking jump control, wherein the feed motor controller controls the feed motor based on the tracking signal generated by the tracking servo controller without using the signal component stored in the storage.

16 Claims, 9 Drawing Sheets

OPEN LOOP

0dB
CLOSE LOOP

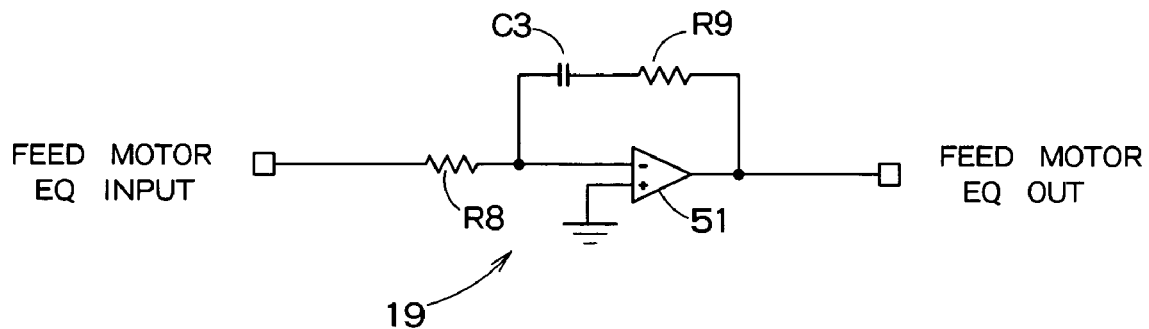
F I G. 5
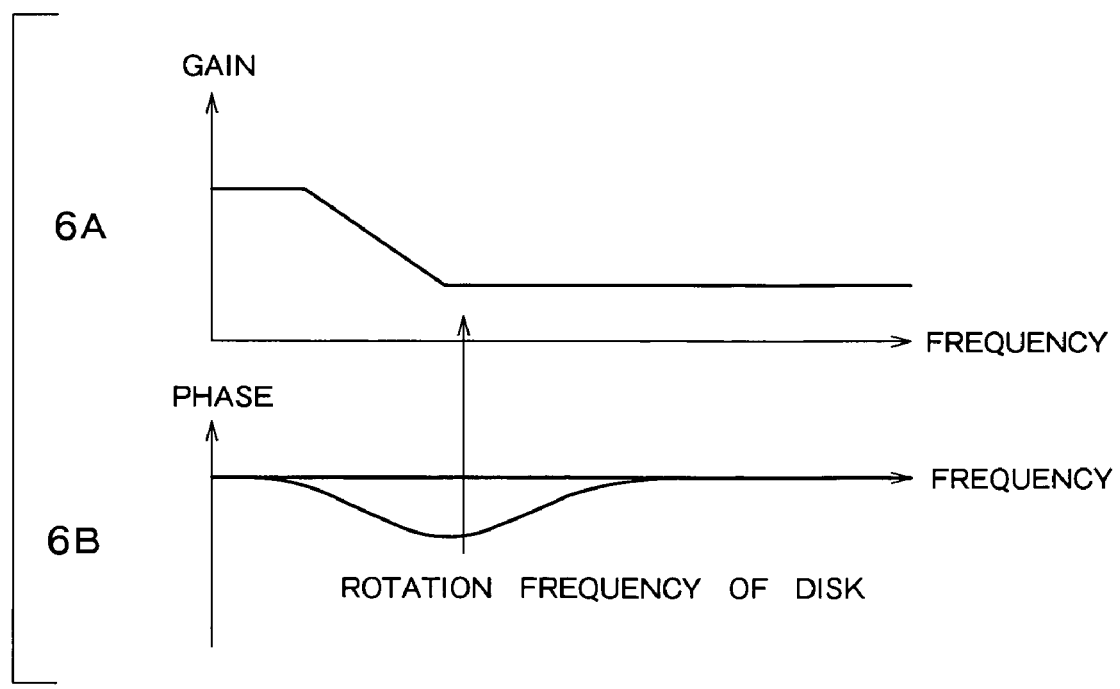
F I G. 6

ROTATION CORRECTING APPARATUS AND OPTICAL DISK APPARATUS

CROSS REFERENCE TO RELATED APPLICATIONS

This application claims benefit of priority under 35USC§119 to Japanese Patent Application No. 2003-399773, filed on Nov. 28, 2003, the entire contents of which are incorporated by reference herein.

BACKGROUND OF THE INVENTION

1. Field of the Invention

The present invention relates to a rotation correcting apparatus and an optical disk apparatus that is used to record or reproduce data from an optical disk.

2. Related Art

In recent years, along the increase in rotation speed such as a CD-R/RW or a DVD-Drive, a drive unit that rotates a disk at near a limit rotation number of a disk motor and a pickup mechanism is being developed progressively. For example, techniques of increasing the data reading performance of a wobbling disk or an eccentric disk during a high-speed rotation and improving the accuracy of track jump and layer jump in a DVD double-layer disk is proposed (see Japanese Patent Application Laid-open Publication No. 2003-263760).

According to the technique described in the above document, a signal that follows the eccentricity or wobbling of the optical disk is A/D converted, and is stored in the memory. Based on the data stored in this memory, a pickup or a feed motor that shifts the pickup to a radial direction of the optical disk is controlled.

According to the above document, both a tracking servo system and a feed motor control system are subjected to eccentricity correction. However, the output from a feed motor control circuit that controls the feed motor makes no change irrespective presence or absence of eccentricity correction. A phase of a control signal from the feed motor control system is delayed from that of a control signal of the tracking servo system due to a phase delay in the feed motor control circuit. Therefore, when eccentricity correction is carried out in both the tracking servo system and the feed motor control system, the operation of the feed motor becomes unstable, because the actual eccentricity of the optical disk and the operation of the feed motor are not in the same phase. As a result, the servo control of the tracking servo system is not convergent.

SUMMARY OF THE INVENTION

A rotation correcting apparatus according to one embodiment of the present invention, comprising:

a tracking servo controller which generates a tracking signal to perform a tracking servo control for guiding an optical beam spot outputted from a pickup to tracks of an optical disk and a track jump control for moving the optical beam spot to a certain track;

a feed motor controller which controls a feed motor for moving said pickup to radius direction of the optical disk;

a storage which stores signal component with a prescribed frequency band including a rotation frequency of the optical disk, said signal component being included in an output signal of said tracking servo controller; and a combination unit which combines the signal component stored in said storage with the tracking signal to generate an ultimate tracking signal for the tracking servo control and the tracking jump control, wherein said feed motor controller controls said feed motor based on the tracking signal generated by said tracking servo controller without using the signal component stored in said storage.

BRIEF DESCRIPTION OF THE DRAWINGS

FIG. 5 is a circuit diagram showing one example of a detailed configuration of the feed motor control circuit.

FIGS. 6A and 6B are characteristic diagrams of the feed motor control circuit.

DETAILED DESCRIPTION OF THE INVENTION

Hereafter, a rotation correcting apparatus and an optical disk apparatus according to the present invention will be described more specifically with reference to the drawings.

FIRST EMBODIMENT

Figure 1:
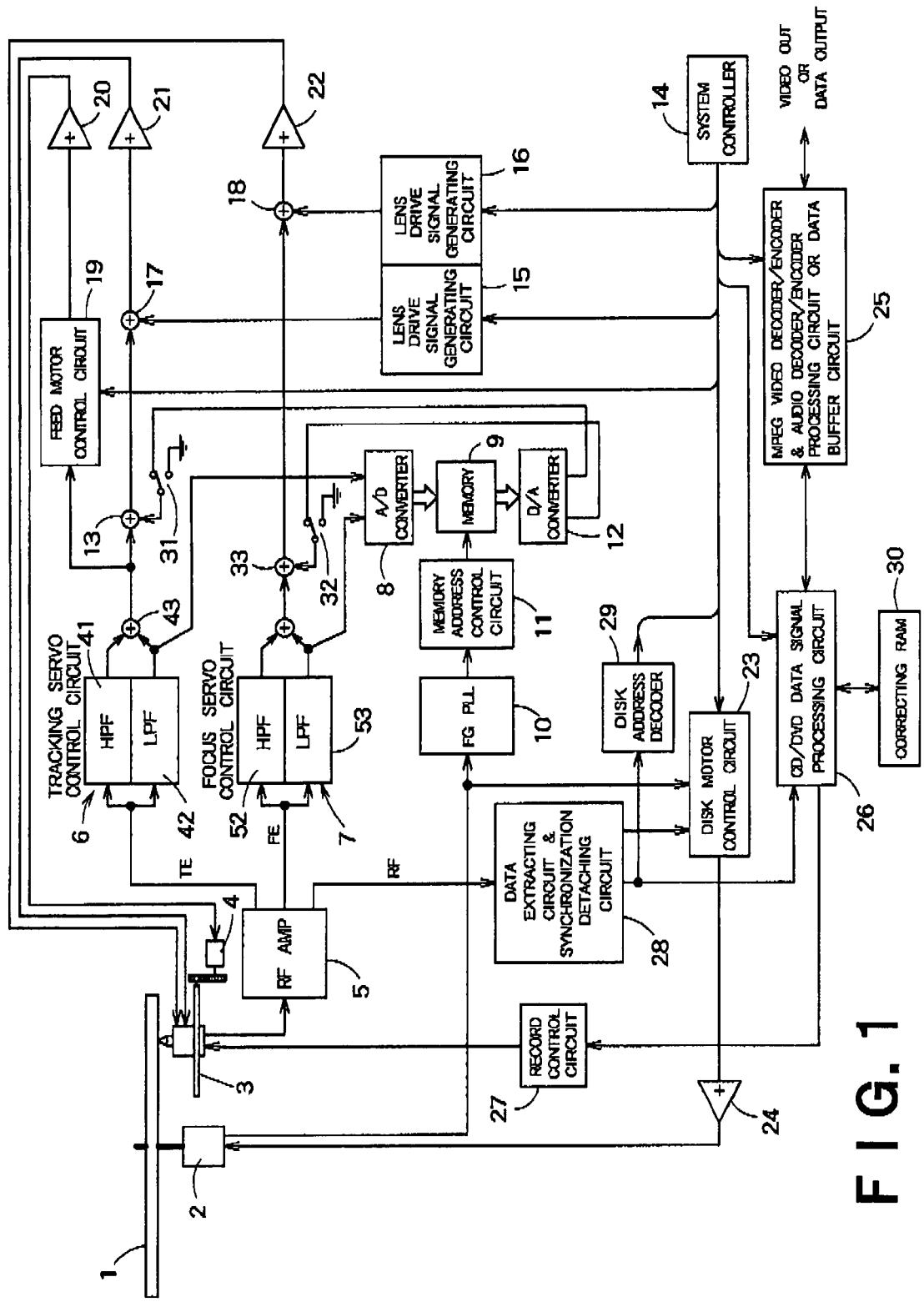
FIG. 1 is a block diagram showing a schematic configuration of a rotation correcting apparatus according to a first embodiment of the present invention.

FIG. 1 is a block diagram showing a schematic configuration of a rotation correcting apparatus according to a first embodiment of the present invention. The rotation correcting apparatus shown in FIG. 1 is used to record data onto or reproduce data from an optical disk (CD, CD-ROM, CD-R, CD-RW, DVD-ROM, DVD±R, DVD-RAM, DVD±RW, etc.). The rotation correcting apparatus shown in FIG. 1 has at least one of a reproduction function of reading data recorded on the optical disk and reproducing the data, and a recording function of recording data onto the optical disk.

The rotation correcting apparatus shown in FIG. 1 includes a disk motor 2, a pickup 3, a motor 4, an RF amplifier 5 (RF Amp), a tracking servo control circuit 6, a focus servo control circuit 7, and A/D converter 8, a memory 9, and FG PLL 10, a memory address control circuit 11, a D/A converter 12, an adder 13, a system controller 14, lens drive signal generating circuits 15 and 16, an adder 17, an adder 18, a feed motor control circuit 19, a motor driver 20, actuator drivers 21 and 22, a disk motor control circuit 23, a disk motor driver 24, an MPEG video decoder/encoder & audio decoder/encoder processing circuit or data buffer circuit 25, a CD/DVD data signal processing circuit 26, a record control circuit 27, a data extracting circuit & synchronization detaching circuit 28, a disk address decoder 29, a correcting RAM 30, switch circuits 31 and 32, and an adder 33.

The disk motor 2 rotates an optical disk 1. The pickup 3 irradiates an optical beam spot to the optical disk 1. The motor 4 shifts the pickup 3 to a radial direction of the optical disk 1. The RF amplifier 5 amplifies an RF signal as an information signal read from the optical disk 1. The tracking servo control circuit 6 controls a tracking actuator of the pickup 3 based on a tracking error signal output from the RF amplifier 5. The focus servo control circuit 7 controls a focus actuator of the pickup 3 based on a focus error signal output from the RF amplifier 5. The A/D converter 8 conducts A/D conversion with respect to outputs from the tracking servo control circuit 6 and the focus servo control circuit 7. The memory 9 stores data indicating wobbling or eccentricity output from the A/D converter 8. The FG PLL 10 generates a clock signal synchronous with an FG signal output from the disk motor 2. The memory address control circuit 11 generates an address based on a clock signal generated by the FG PLL 10. The D/A converter 12 reads data corresponding to the address generated based on the memory address control from the memory 9, and D/A converts the read data. The adder 13 adds an analog signal output from the D/A converter 12 to an output signal from the tracking servo control circuit 6. The system controller 14 controls the whole apparatus shown in FIG. 1. The adder 17 adds an output from the lens drive signal generating circuit 15 to an output from the adder 13. The adder 18 adds an output from the lens drive signal generating circuit 16 to an output from the focus servo control circuit 7.

The RF amplifier 5 extracts a tracking error signal TE, a focus error signal FE, and an RF signal as an information signal, from a signal read from the optical disk 1 with the pickup 3.

Figure 2:
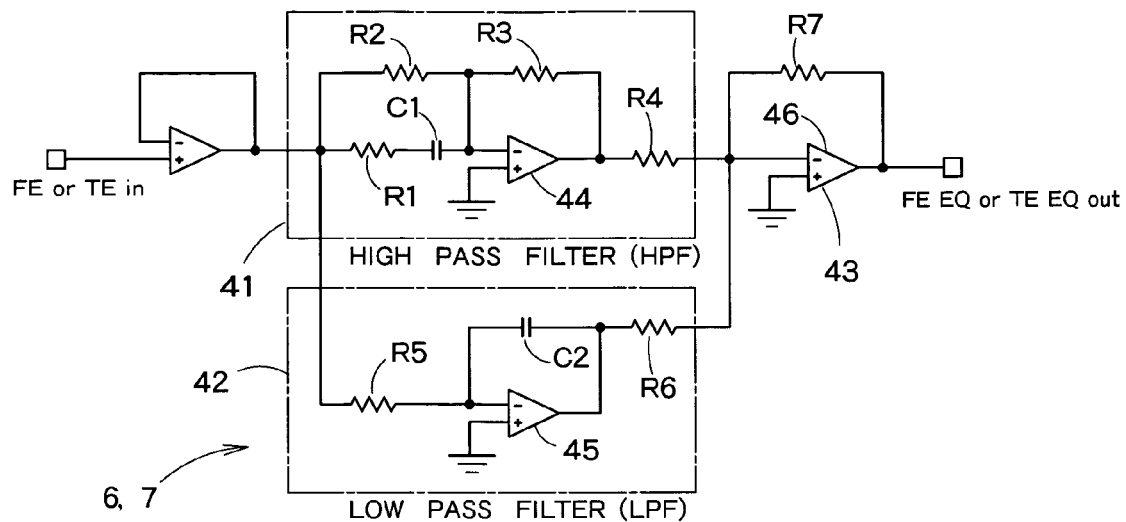
FIG. 2 is a circuit diagram showing one example of detailed configuration of a tracking servo control circuit and a focus servo control circuit.

The tracking error signal TE is input to the tracking servo control circuit 6. The tracking servo control circuit 6 includes a high-pass filter (HPF) 41, a low-pass filter (LPF) 42, and an adder 43 that combines outputs from filters together, of which detailed configuration is as shown in FIG. 2. The high-pass filter 41 is an active filter that includes an operational amplifier 44, resistors R1 to R4, and a capacitor C1. The high-pass filter 41 is used to advance a phase of the tracking error signal, that is, for phase compensation. The low-pass filter 42 is an active filter that includes an operational amplifier 45, resistors R5 and R6, and a capacitor C2. The low-pass filter 42 is mainly used to obtain a gain, that is, for gain compensation. The adder 43 includes an operational amplifier 46, and a resistor R7 connected between a negative input terminal and an output terminal of the operational amplifier 46.

Figure 3:
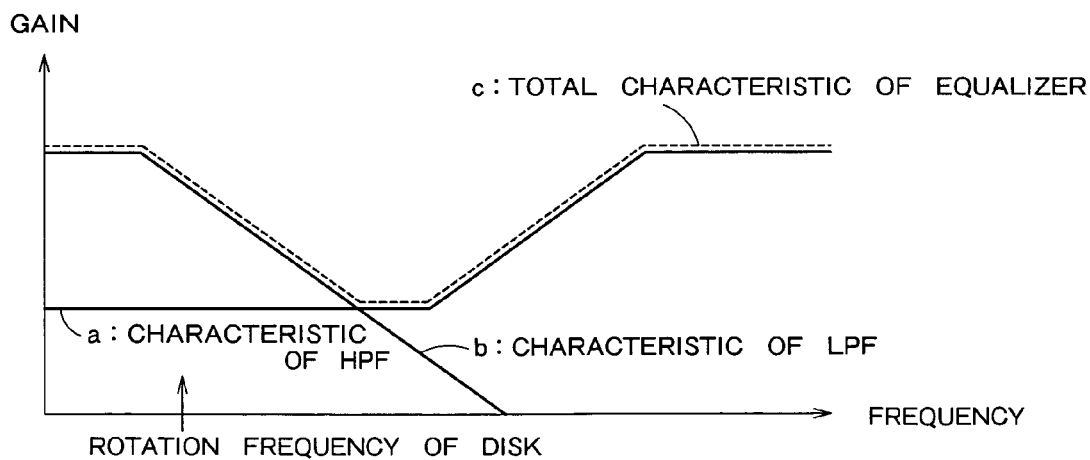
FIG. 3 is an equalize characteristic diagram of the tracking servo control circuit.

FIG. 3 is an equalize characteristic diagram of the tracking servo control circuit 6, where a solid-line waveform "a" is a characteristic diagram of the high-pass filter 41, a solid-line waveform "b" is a characteristic diagram of the low-pass filter 42, and a dotted-line waveform "c" is a characteristic diagram of a total characteristic. As shown in FIG. 3, gains become high in a low frequency area and a high frequency area. However, a rotation frequency of the optical disk 1 needs to be within a passage of the low-pass filter 42.

Figure 4A:
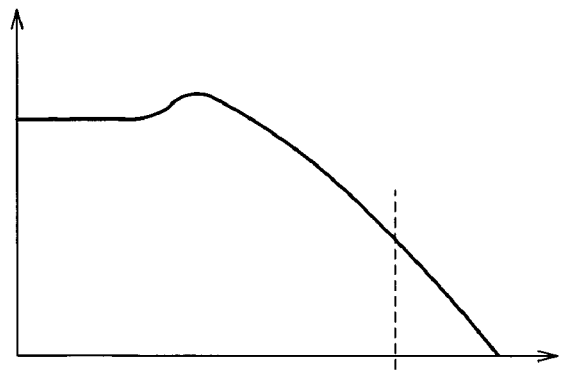
FIGS. 4A-4D are characteristic diagrams of the tracking servo system.
Figure 4B:
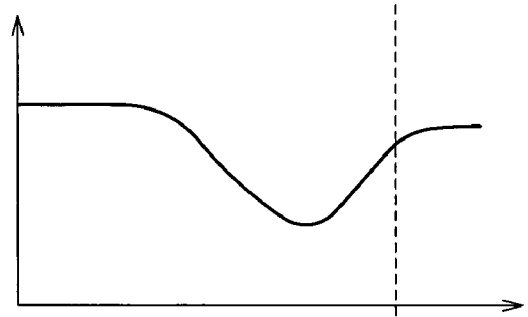
Figure 4C:
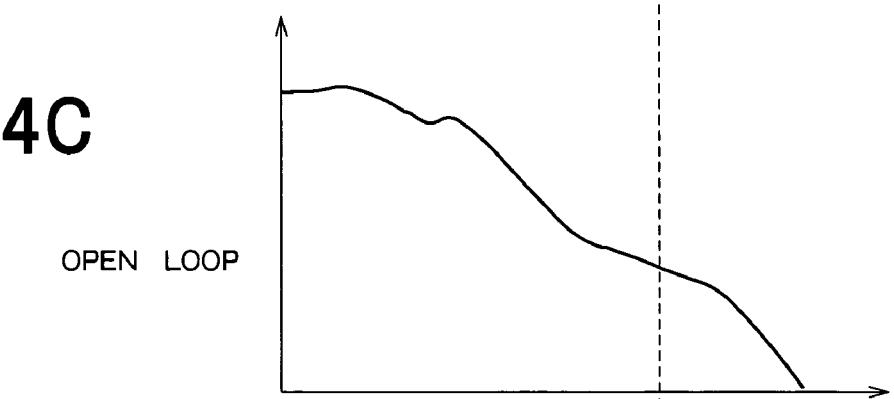
Figure 4D:
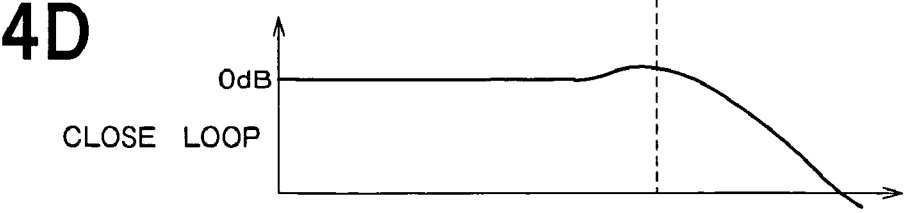

FIGS. 4A-4D are characteristic diagrams of the tracking servo system, where FIG. 4A is a characteristic diagram of the tracking actuator, FIG. 4B is a diagram showing a transmission function of the tracking servo control circuit 6, FIG. 4C is an open loop characteristic diagram of the tracking servo system, and FIG. 4D is a closed loop characteristic diagram of the tracking servo system.

As is clear from FIG. 4D, the tracking servo system controls such that a gain in the low frequency area becomes 0 dB. Because wobbling or eccentricity occurs in the low frequency area, according to the present embodiment, eccentricity is corrected based on a low-frequency component of the tracking error signal.

The adder 17 adds the tracking error signal to an output signal from the lens drive signal generating circuit 15 during a track jump operation. An output signal from the adder 17 is input to the actuator driver 21, thereby driving the tracking actuator of the pickup 3. The output signal from the tracking servo control circuit 6 is also sent to the feed motor control circuit 19, thereby driving the feed motor 4 via the motor driver 20.

FIG. 5 is a circuit diagram showing one example of a detailed configuration of the feed motor control circuit 19. The feed motor control circuit 19 shown in FIG. 5 includes an operational amplifier 51, a resistor R8 connected between an input terminal and a negative input terminal of the operational amplifier 51, and a capacitor C3 and a resistor R9 connected in series between the negative input terminal and an output terminal of the operational amplifier 51.

FIGS. 6A and 6B are characteristic diagrams of the feed motor control circuit 19, where FIG. 6A is a characteristic diagram showing a relationship between a frequency and a gain of the feed motor 4, and FIG. 6B is a characteristic diagram showing a relationship between a frequency and a phase of the feed motor 4. From FIG. 6A and FIG. 6B, it is clear that a phase is delayed in the rotation frequency (eccentric frequency) band of the disk motor 2. Due to the characteristics and the mechanical phase delay of the feed motor 4 system as shown in FIG. 6, the actual eccentricity does not coincide with the move of the feed motor 4, and therefore, the move of the feed motor 4 cannot be set ideal relative to the eccentricity. According to the present embodiment, the eccentricity is not corrected in the feed motor control system.

The focus error signal FE is input to the focus servo control circuit 7. The focus servo control circuit 7 also has a high-pass filter 52 and a low-pass filter 53 having a configuration similar to that shown in FIG. 2. The A/D converter 8 conducts A/D conversion with respect to a low-frequency component of the focus servo control circuit 7, and stores the converted result into the memory 9.

During a focus searching, the adder 13 adds the focus error signal and the output of the lens drive signal generating circuit 16, and the added result is sent to the actuator driver 22, thereby driving the focus actuator of the pickup 3.

To read and reproduce data from the optical disk 1, the RF signal is sent to the data extracting circuit & synchronization detaching circuit 28. The data extracting circuit binarizes the RF signal, extracts a bit clock, extracts a synchronization signal, and sends data to the CD/DVD data signal processing circuit 26.

The CD/DVD data signal processing circuit 26 demodulates the data, and corrects the data using the correcting RAM 30. The synchronization signal is sent to the disk motor control circuit 23, which controls the disk motor 2 via the motor driver 24. In the case of the CAV control, the FG signal from the disk motor 2 is input to the disk motor control circuit 23. To reproduce a video with a device like a DVD video recorder, the data corrected by the CD/DVD data signal processing circuit 26 is sent to the MPEG video decoder and audio decoder processing circuit 25, and a video signal and an audio signal are output.

To record data onto the optical disk 1, the MPEG encoder 25 converts the video signal and the audio signal into digital data. The CD/DVD data signal processing circuit 26 converts the data into a data format which can record it on the optical disk 1, and modulates the data. In the case of the DVD recording/reproducing drive, the data buffer 25 exchanges data with the host computer, and the CD/DVD data signal processing circuit 26 modulates/demodulates the data. The system controller 14 controls the control timing of each control circuit and the total set.

The system controller 14 can read address information of the optical disk 1 from the CD/DVD data signal processing circuit 26.

The FG PLL 10 generates a multiplied clock synchronous with the FG signal, based on the FG signal output from the disk motor 2. Most of motors recently used for the optical disk 1 are hall motors. A signal of a hall sensor within the motor is fetched as the FG signal, thereby generating the FG signal. In most cases, number of poles per one rotation of the motor is relatively small. The FG PLL 10 generates a multiplied clock of a high frequency synchronous with the FG in order to increase the resolution in the rotation direction. The memory address control circuit 11 controls the data memory 9 based on this clock. The data memory 9 is controlled in the clock based on the FG signal, and fetches data in synchronism with the rotation. Data can be read from the memory 9.

Figure 7:
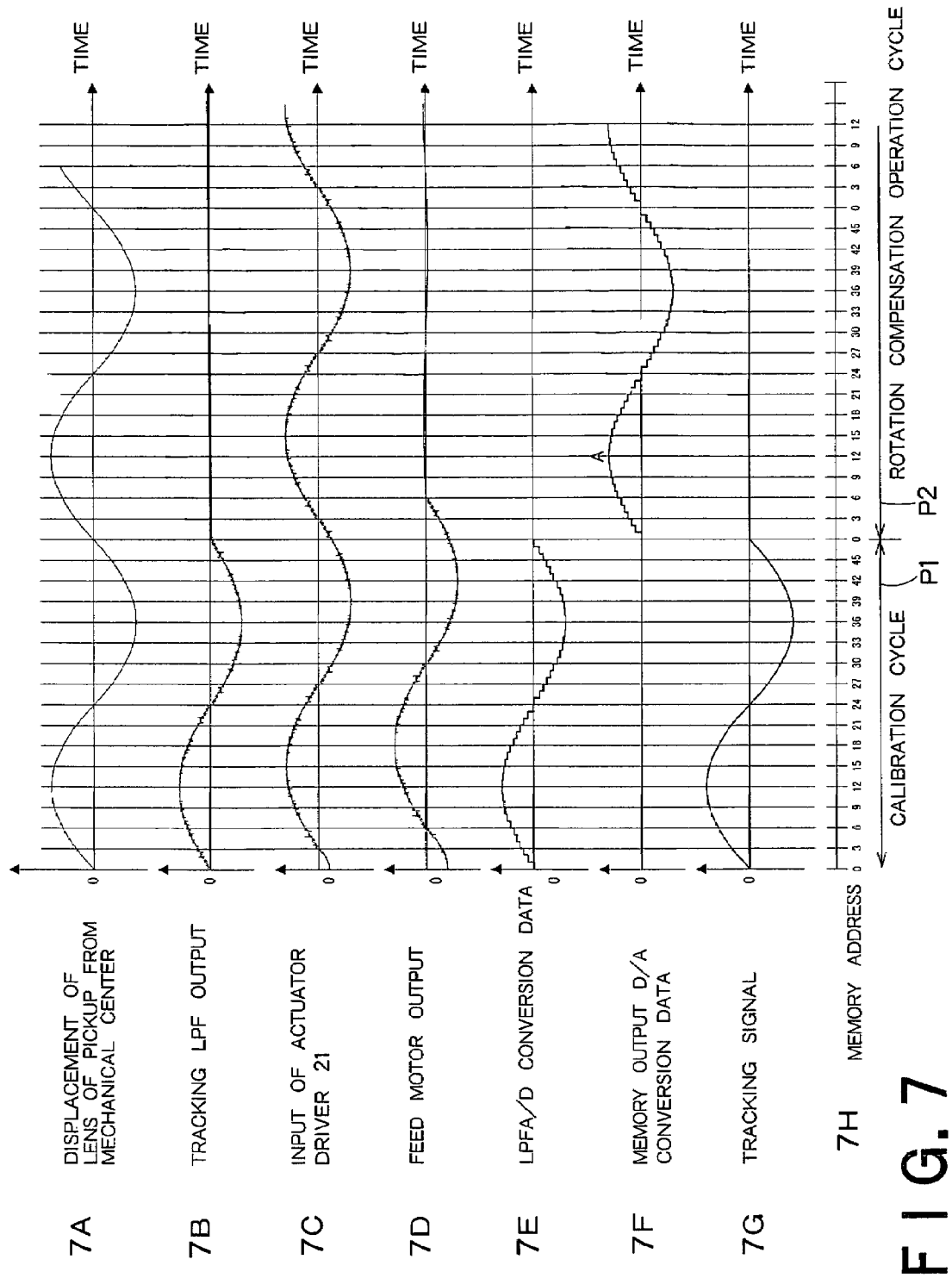
FIGS. 7A-7H are waveform diagrams showing an eccentric component of the rotation correcting apparatus according to the present embodiment.

FIGS. 7A-7H are waveform diagrams showing an eccentric component of the rotation correcting apparatus according to the present embodiment. FIG. 7A is a waveform diagram showing a displacement of the lens of the pickup 3 from the mechanical center, FIG. 7B is a waveform diagram of an output from the low-pass filter 42 within the tracking servo control circuit 6, FIG. 7C is a waveform diagram of an input to the actuator driver 21, FIG. 7D is a waveform diagram of an output from the feed motor control circuit 19, FIG. 7E is a waveform diagram of an output from the A/D converter 8, FIG. 7F is a waveform diagram of an output from the D/A converter 12, and FIG. 7G is a waveform diagram of a tracking signal that is input to the pickup 3.

As shown in FIGS. 7A-7H, the rotation correcting apparatus according to the present embodiment has two operation modes of a calibration cycle period p1 during which an eccentric component of the optical disk is stored in the memory, and a rotation compensation operation period p2 during which data is recorded onto or reproduced from the optical disk while carrying out eccentricity correction. During the calibration cycle period p1, the switch circuits 31 and 32 shown in FIG. 1 are in the off state, and the adder 13 and 33 do not carry out the add processing.

As shown in FIG. 7A, the lens of the pickup 3 is shaken largely due to eccentricity. An output signal from the low-pass filter 42 within the tracking servo control circuit 6 shown in FIG. 7B is a signal that follows eccentricity. This signal determines a position of the lens of the pickup 3 from the mechanical center. This signal is converted into a digital signal and is stored into the memory 9, and, at the same time, is input to the actuator driver 21 as shown in FIG. 7C.

The output (FIG. 7E) from the A/D converter 8 during the calibration cycle period is stored into the memory 9. This is an eccentric component. During the rotation compensation operation period after the calibration cycle, the output (FIG. 7F) from the memory 9 is read, and eccentricity correction is carried out to the tracking signal (FIG. 7G). As a result, the output from the tracking servo control circuit 6 has no eccentric component, and the output from the feed motor control circuit 19 has no eccentric component either (FIG. 7D).

Figure 8:
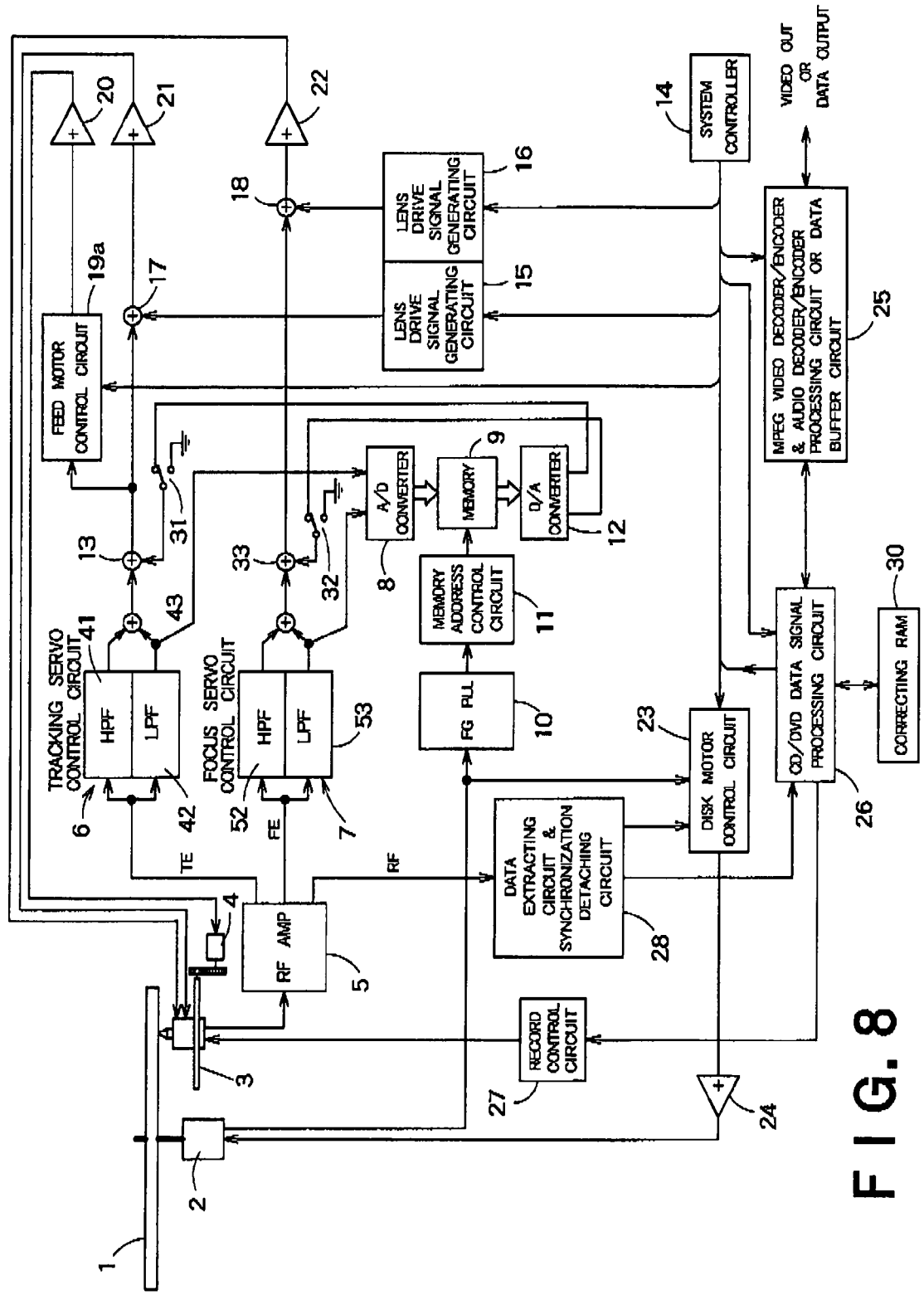
FIG. 8 is a block diagram showing an example of carrying out eccentricity correction to the feed motor control system based on eccentricity data stored in the memory.

FIG. 8 shows an example of carrying out eccentricity correction to the feed motor control system based on eccentricity data stored in the memory. According to the rotation correcting apparatus shown in FIG. 8, a connection position of the adder 13 is different from that shown in FIG. 1. The output from the adder 13 shown in FIG. 8 is also input to the feed motor control circuit 19.

Figure 9:
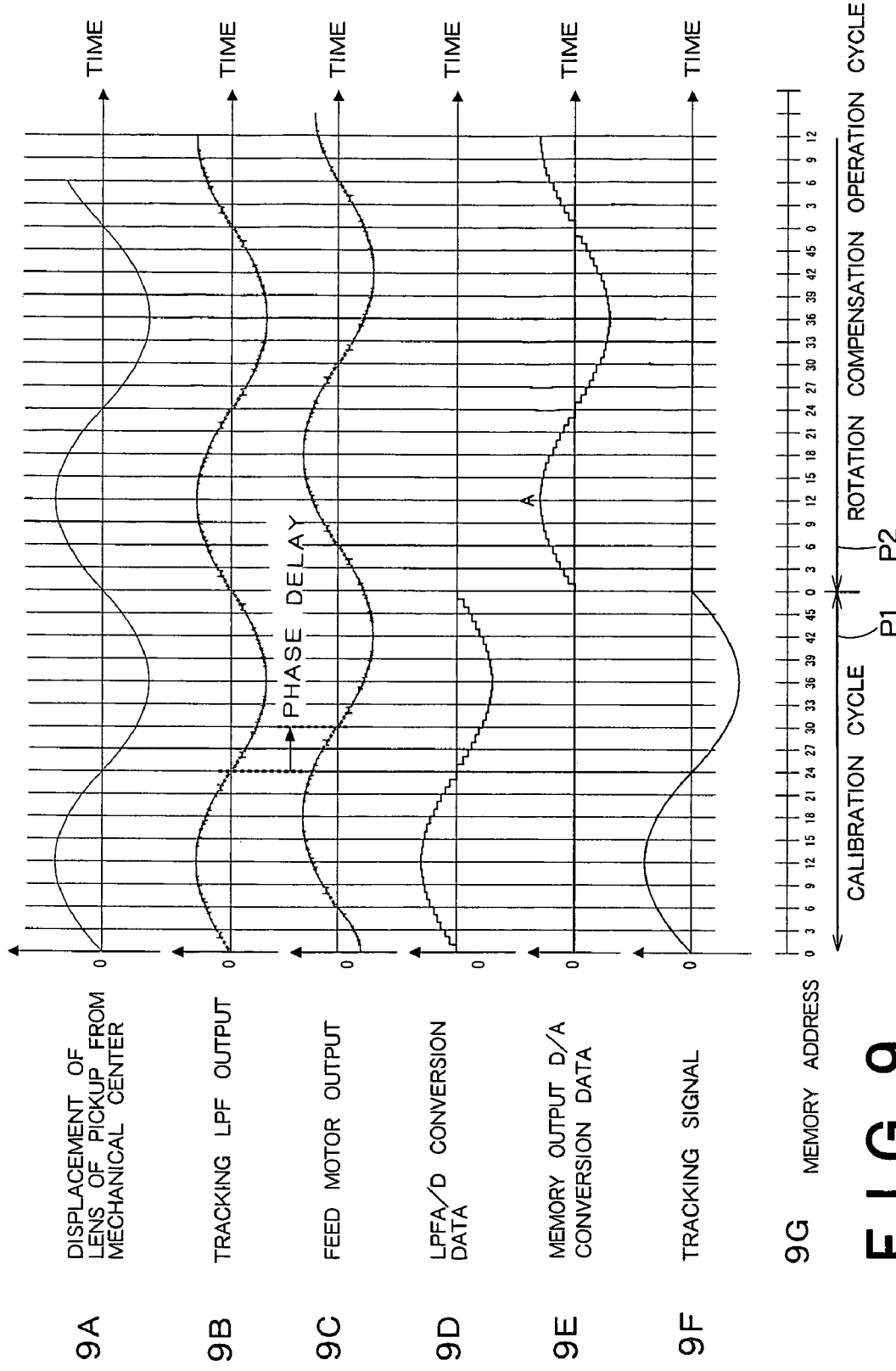
FIG. 9 is a waveform diagram showing an eccentric component shown in FIG. 8.

FIG. 9 is a waveform diagram showing an eccentric component shown in FIG. 8. As shown in FIG. 9, unlike FIG. 7, the waveform of an output from the feed motor control circuit 19 includes an eccentric component, during the rotation compensation operation period p2. Therefore, according to the rotation correcting apparatus shown in FIG. 8, the operation of the feed motor 4 becomes unstable. As a result, it may take a longer time for the operation of the tracking servo to be stabilized.

As explained above, according to the first embodiment, an eccentric component stored in the memory 9 is not applied to the feed motor control circuit 19. Therefore, the operation of the feed motor 4 is stabilized. Consequently, the operation of the tracking servo can be stabilized, and the time taken for the tracking servo to be converged can be shortened.

SECOND EMBODIMENT

According to a second embodiment, tracking servo is carried out by digital processing.

Figure 10:
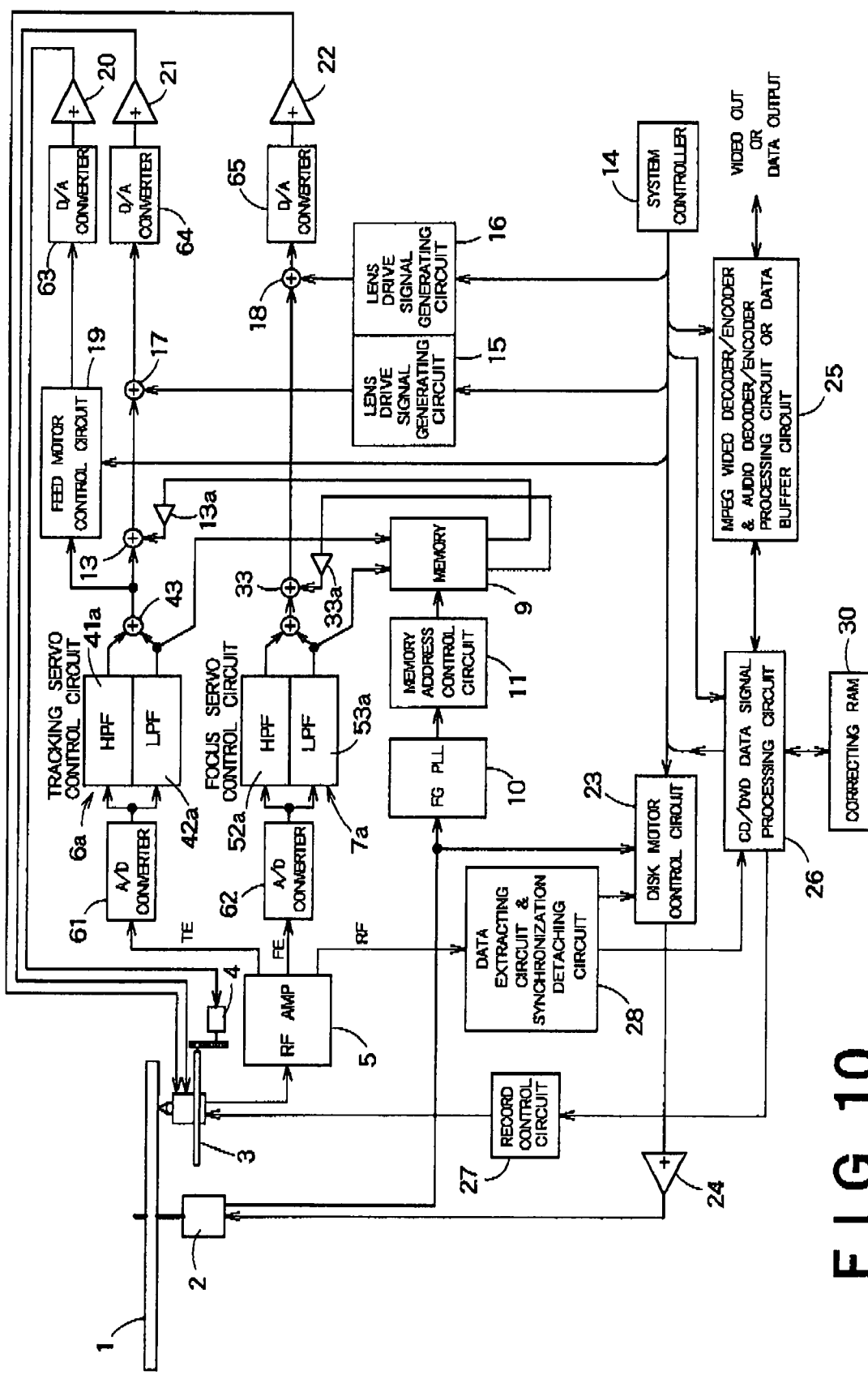
FIG. 10 is block diagram showing a schematic configuration of a rotation correcting apparatus according to the second embodiment of the present invention.

FIG. 10 is block diagram showing a schematic configuration of a rotation correcting apparatus according to the second embodiment of the present invention. In FIG. 10, constituent elements common to those shown in FIG. 1 are designated with like reference numerals, and differences between those drawings are mainly explained below.

The rotation correcting apparatus shown in FIG. 10 includes an A/D converter 61 that conducts A/D conversion with respect to the tracking error signal TE output from the RF amplifier 5, an A/D converter 62 that conducts A/D conversion with respect to the tracking error signal FE output from the RF amplifier 5, a D/A converter 63 that is connected to a pre-stage of the motor driver 20, and D/A converters 64 and 65 that are connected to pre-stages of the actuator drivers 21 and 22, respectively. A tracking servo control circuit 6a includes a high-pass filter 41a that extracts only a high-frequency component of a digital tracking error signal output from the A/D converter 61, and a low-pass filter 42a that extracts only a low-frequency component. The rotation correcting apparatus shown in FIG. 10 further includes a variable coefficient multiplier 13a that combines an output of the memory 9 with an output of the tracking servo control circuit 6a, and a variable coefficient multiplier 33a that combines the output from the memory 9 with an output from the focus servo control circuit 7a.

Figure 11:
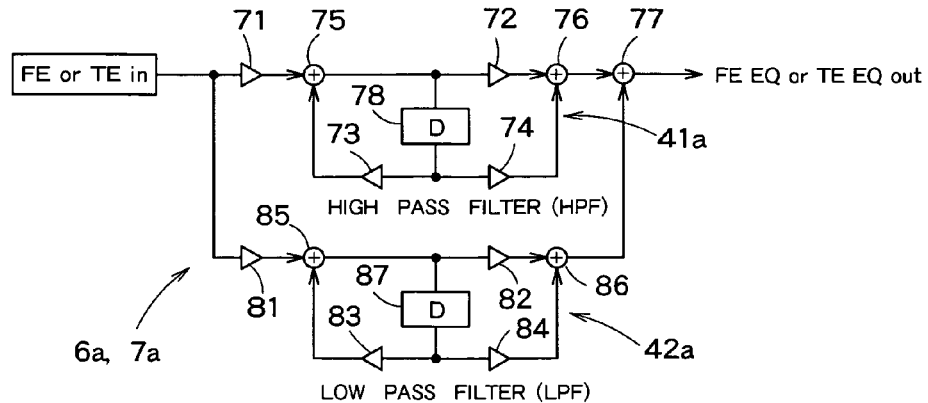
FIG. 11 is a circuit diagram showing one example of detailed configurations of the tracking servo control circuits.

FIG. 11 is a circuit diagram showing one example of detailed configurations of the tracking servo control circuits 6a and 7a. As shown in FIG. 11, the high-pass filter 41a includes digital coefficients 71 to 74, adders 75 to 77, and one sample delay unit 78. The low-pass filter 42 includes buffers 81 to 84, adders 85 and 86, and one sample delay unit 87. An eccentric component is extracted from the output from the low-pass filter 42 in a similar manner to that according to the first embodiment.

Figure 12:
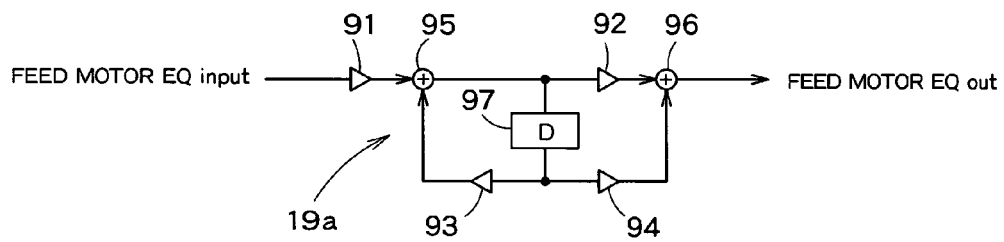
FIG. 12 is a circuit diagram showing one example of a detailed configuration of the motor control circuit.

FIG. 12 is a circuit diagram showing one example of a detailed configuration of the motor control circuit 19a. As shown in FIG. 12, the feed motor control circuit 19a includes digital coefficients 91 to 94, adders 95, and one sample delay unit 97.

Figure 13:
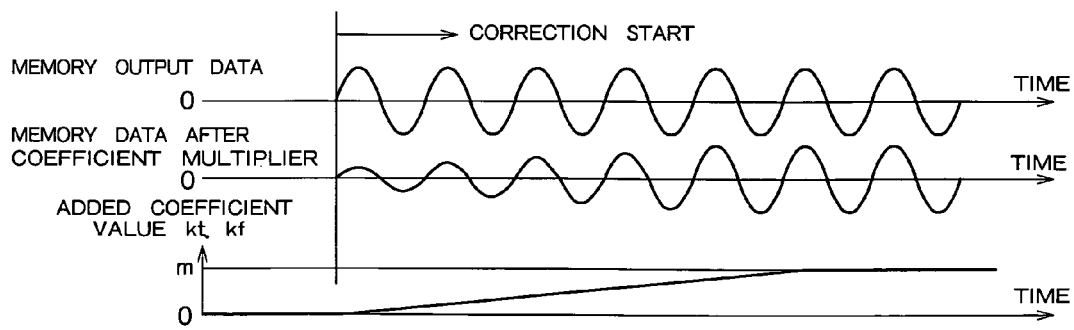
FIG. 13 is a waveform diagram showing the operation of the variable coefficient multipliers 13a and 33a shown in FIG. 10.

FIG. 13 is a waveform diagram showing the operation of the variable coefficient multipliers 13a and 33a shown in FIG. 10. The variable coefficient multipliers 13a and 33a shown in FIG. 10 gradually increase coefficients to avoid deviation of the tracking servo and the focus servo.

As explained above, according to the second embodiment, tracking servo control and focus servo control are carried out digitally. Therefore, there is little influence of noise, and integration becomes easy.

At least a part of the rotation correcting devices explained in the first and the second embodiments can be prepared in a semiconductor chip. For example, each part is accommodated in one chip, excluding the disk motor 2, the pickup 3, the feed motor 4, the RF amplifier 5, the motor driver 20, the actuator drivers 21 and 22, and the system controller 14 shown in FIG. 1. With this arrangement, a circuit area can be reduced, and costs of parts can be reduced. Furthermore, the system controller 14 and the RF amplifier 5 can be also incorporated in the chip.

What is claimed is:

1. A rotation correcting apparatus, comprising:
   a tracking servo controller which generates a tracking signal to perform a tracking servo control for guiding an optical beam spot outputted from a pickup to tracks of an optical disk and a track jump control for moving the optical beam spot to a certain track;
   a feed motor controller which controls a feed motor for moving said pickup to radius direction of the optical disk;
   a storage which stores signal components with a prescribed frequency band including a rotation frequency of the optical disk, said signal components being included in an output signal of said tracking servo controller and including an eccentricity component of the optical disk; and
   a combination unit which combines the signal components stored in said storage with the tracking signal to generate an ultimate tracking signal for the tracking servo control and the tracking jump control,
   wherein said feed motor controller controls said feed motor based on the tracking signal generated by said tracking servo controller without using the signal component stored in said storage.

2. The rotation correcting apparatus according to claim 1, wherein said storage stores the signal components during a calibration cycle period before beginning to record or reproduce the optical disk.

3. The rotation correcting apparatus according to claim 2, wherein the signal component with the prescribed frequency band includes a signal component with low frequency among a tracking signal generated by said tracking servo controller.

4. The rotation correcting apparatus according to claim 1, wherein the tracking signal generated by said tracking servo controller is directly applied to said feed motor controller and said combination unit.

5. The rotation correcting apparatus according to claim 1, wherein said feed motor controller has an amplifier which generates a feed motor control signal by performing gain adjustment of the tracking signal generated by said tracking servo controller.

6. The rotation correcting apparatus according to claim 1, further comprising a high frequency amplifier which detects a tracking error signal, a focus error signal and a high frequency signal included in an information signal read out by said pickup,
   wherein:
   said tracking servo controller includes:
   a low pass filter which extracts a prescribed low frequency component including a rotation frequency of the optical disk included in said tracking error signal; and
   a high pass filter which extracts a higher frequency component than the rotation frequency of the optical disk included in said tracking error signal, and said storage stores the low frequency component extracted by said low pass filter.

7. The rotation correcting apparatus according to claim 6 further comprising an A/D converter which conducts A/D conversion of the tracking error signal included in said high frequency amplifier,
   wherein said tracking servo controller generates the tracking signal based on the tracking error signal converted by said A/D converter.

8. The rotation correcting apparatus according to claim 6, further comprising a focus signal generator which:
   combines the signal components stored in said storage with the focus error signal and
   generates a focus signal for performing focus adjustment of the optical beam spot.

9. An optical disk apparatus, comprising:
   a pickup which outputs an optical beam spot;
   a tracking servo controller which generates a tracking signal to perform a tracking servo control for guiding an optical beam spot outputted from said pickup to tracks of an optical disk and a track jump control for moving the optical beam spot to a certain track;
   a feed motor controller which controls a feed motor for moving said pickup to radius direction of the optical disk;
   a storage which stores signal components with a prescribed frequency band including a rotation frequency of the optical disk, said signal components being included in an output signal of said tracking servo controller and including an eccentricity component of the optical disk; and
   a combination unit which combines the signal components stored in said storage with the tracking signal to generate an ultimate tracking signal for the tracking servo control and the tracking jump control,
   wherein said feed motor controller controls said feed motor based on the tracking signal generated by said tracking servo controller without using the signal components stored in said storage.

10. The optical disk apparatus according to claim 9, wherein said storage stores the signal components during a calibration cycle period before beginning to record or reproduce the optical disk.

11. The optical disk apparatus according to claim 9, wherein the signal components with the prescribed frequency band include a signal component with low frequency among a tracking signal generated by said tracking servo controller.

12. The optical disk apparatus according to claim 9, wherein the tracking signal generated by said tracking servo controller is directly applied to said feed motor controller and said combination unit.

13. The optical disk apparatus according to claim 9, wherein said feed motor controller has an amplifier which generates a feed motor control signal by performing gain adjustment of the tracking signal generated by said tracking servo controller.

14. The optical disk apparatus according to claim 9, further comprising a high frequency amplifier which detects a tracking error signal, a focus error signal and a high frequency signal included in an information signal read out by said pickup, wherein:

said tracking servo controller includes:

a low pass filter which extracts a prescribed low frequency component including a rotation frequency of the optical disk included in said tracking error signal and a high pass filter which extracts a higher frequency component than the rotation frequency of the optical disk included in said tracking error signal, and said storage stores the low frequency component extracted by said low pass filter.

15. The optical disk apparatus according to claim 14 further comprising an A/D converter which conducts A/D conversion of the tracking error signal included in said high frequency amplifier, wherein said tracking servo controller generates the tracking signal based on the tracking error signal converted by said A/D converter.

16. The optical disk apparatus according to claim 14, further comprising a focus signal generator which:

combines the signal components stored in said storage with the focus error signal and generates a focus signal for performing focus adjustment of the optical beam spot.

* * * * *